（12） United States Patent
Kim et al.

(10) Patent No.: US 9,087,186 B2
(45) Date of Patent: Jul. 21, 2015

(54) DEVICE AND METHOD FOR AUTHENTICATING CONTENTS-PROTECTED INFORMATION

(71) Applicant: Toshiba Samsung Storage Technology Korea Corporation, Suwon-si (KR)

(72) Inventors: Yong-jun Kim, Yongin-si (KR); Sang-hoon Hyun, Seongnam-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 14/022,465

(22) Filed: Sep. 10, 2013

(65) Prior Publication Data

US 2014/0075544 A1  Mar. 13, 2014

(30) Foreign Application Priority Data

Sep. 11, 2012  (KR) .................... 10-2012-0100662

(51) Int. Cl.
*G06F 12/00* (2006.01)
*G06F 21/44* (2013.01)
*G06F 21/10* (2013.01)
*G06F 21/80* (2013.01)
*G11B 20/00* (2006.01)

(52) U.S. Cl.
CPC ............... *G06F 21/44* (2013.01); *G06F 21/10* (2013.01); *G06F 21/80* (2013.01); *G11B 20/00188* (2013.01)

(58) Field of Classification Search
CPC . H04L 63/0272; H04L 63/0428; H04L 63/08; H04L 63/20; H04L 2209/60; H04L 2463/081; G06F 21/10; G06F 21/44; G06F 21/80; G11B 20/00188

USPC .......................................................... 726/15
See application file for complete search history.

(56) References Cited

U.S. PATENT DOCUMENTS

| 6,119,116 | A | 9/2000 | Rose |
| 8,024,589 | B2 * | 9/2011 | Okoge et al. .................. 713/320 |
| 8,199,622 | B2 * | 6/2012 | Yang et al. .................... 369/53.2 |
| 2008/0170688 | A1 * | 7/2008 | Jung et al. .................... 380/201 |
| 2013/0021885 | A1 * | 1/2013 | Jeong ......................... 369/47.15 |
| 2014/0075544 | A1 * | 3/2014 | Kim et al. ...................... 726/16 |

FOREIGN PATENT DOCUMENTS

| JP | 2012-048809 | 3/2012 |
| KR | 10-0279339 | 3/2001 |

(Continued)

OTHER PUBLICATIONS

Korean Office Action issued Aug. 27, 2013 in counterpart Korean Patent Application No. 10-2012-0100662 (4 pages, in Korean).

*Primary Examiner* — Dant Shaifer Harriman
*Assistant Examiner* — Abiy Getachew
(74) *Attorney, Agent, or Firm* — NSIP Law

(57) ABSTRACT

Provided are an authentication method that includes connecting an optical disc drive (ODD) for driving a medium and a host device for reproducing contents stored in the medium using an interface. An authentication for reproducing the contents is performed by mutually exchanging data between the host device and the ODD via the authentication area of the ODD for storing the data. Accordingly, the ODD may convert a file from the optical disc, which is in an intrinsic format, into a format that is recognizable by a host device.

20 Claims, 11 Drawing Sheets

(56) References Cited

FOREIGN PATENT DOCUMENTS

| KR | 2002-0023760 | 3/2002 |
| KR | 10-2006-0081323 | 7/2006 |
| KR | 10-2010-0008678 | 1/2010 |
| WO | WO 2009/017289 A1 | 2/2009 |

\* cited by examiner

DEVICE AND METHOD FOR AUTHENTICATING CONTENTS-PROTECTED INFORMATION

CROSS-REFERENCE TO RELATED APPLICATION(S)

This application claims the benefit under 35 USC §119(a) of Korean Patent Application No. 10-2012-0100662, filed on Sep. 11, 2012, in the Korean Intellectual Property Office, the entire disclosure of which is incorporated herein by reference for all purposes.

BACKGROUND

1. Field

The following description relates to a device and method for authenticating contents-protected information, and more particularly, to an authentication method for a reproduction system having no authentication system.

2. Description of Related Art

Optical disc drives (ODDs) are an example of optical media devices. An ODD is a typical content storing and reproducing device. An optical disc may have a format such as a compact disc (CD) and a digital versatile disc (DVD). Recently, optical media devices compatible with CDs, DVDs, and Bluray discs (BDs) have been introduced.

A typical information display device is a general-purpose device such as a computer. Recently, image reproduction devices such as smart TVs and personal portable terminals such as smart phones or tablet PCs have been developed. These more recent image reproduction devices may be used as A/V hosts for reproducing various contents in various ways.

The image display devices have the ability to display various contents stored in peripheral devices that are connected thereto. However, unlike general-purpose PCs, devices capable of reproducing contents, such as smart TVs, smart phones, and tablet PCs, (hereinafter, referred to reproduction devices) allow for limited connectivity, and thus, lack compatibility with various types of media. While having various host functions provided via an interface such as universal serial bus (USB), WiFi, Bluetooth, and the like, these reproduction devices typically only support a file allocation table (FAT) file system defined by the International Standard Organization (ISO) 9293, and thus, are not capable of directly reproducing contents from optical discs such as CDs or DVDs which use a compact disc file system (CDFS) or a universal disc format (UDF) as a file system.

To reproduce CD/DVD contents using a reproduction device having no connectivity to an ODD, a CD/DVD intrinsic format must be converted to a FAT system. In this case, an authentication process should be performed to protect copy-protected contents, for example, a DVD title. For example, to perform an authentication process, a player application accesses a small computer system interface (SCSI) device driver to issue an advanced technology attachment packet interface (ATAPI) command directly to the ODD. However, a reproduction device that does not have an ODD device driver is not able to perform the authentication process with the ODD.

SUMMARY

In an aspect, there is provided an authentication method for an optical disc drive (ODD) for driving a medium and a host device for reproducing contents stored in the medium, the method including connecting the optical disc drive (ODD) and the host device through an interface device, allocating, in the ODD, an authentication area for storing query data for authenticating contents and result data thereof, and performing an authentication for reproducing contents by mutually exchanging data between the host device and the ODD via the authentication area.

The authentication area may comprise a virtual file stored in an area of the memory.

The virtual file may comprise a format of a file allocation table (FAT) system.

The ODD may be recognized as a non-optical storage device with respect to the host device.

The recognized non-optical storage device may comprise a magnetic disc drive.

The medium may comprise a digital versatile disc (DVD).

The host device and the ODD may be connected to each other via a universal serial bus (USB) method or a WiFi method.

The exchanging of data may comprise the ODD recording information in the authentication area using a file allocation table (FAT) system format.

In an aspect, there is provided a contents reproduction apparatus including an optical disc drive (ODD) configured to drive a medium containing contents, the ODD comprising a memory device including an authentication area for storing data for authentication of the contents, a host device connected to the ODD and configured to generate a command packet for the authentication of the contents and data including parameters, a file system driver configured to store the data in the authentication area of the ODD, and an interface device configured to provide a connection between the host device and the ODD.

The host device and the ODD may be connected to each other via a file allocation table (FAT) file system and the authentication area comprises a virtual file according to the FAT file system.

The host device may recognize the ODD as a non-optical storage device.

The interface device may enable the host device and the ODD to be connected to each other via a universal serial bus (USB) method or a WiFi method.

The ODD may convert a universal disc format (UDF) file system to the FAT file system.

The medium may comprise a digital versatile disc (DVD).

The ODD may further comprise an authentication area manager configured to process the data in the authentication area, execute a command for the authentication of the contents, and store a result in the authentication area.

In an aspect, there is provided an apparatus for reading content from an optical disc, the apparatus including a controller configured to convert a file from the optical disc, which is in an intrinsic format, into a file allocation table (FAT) format that is compatible with a host device, and a storage device configured to store the converted file in an authentication area that is accessible by the host device.

In response to the apparatus being connected to the host device via a universal serial bus (USB) connection, the controller may be further configured to change a USB descriptor of the apparatus into a subclass that is recognizable by the host device.

The controller may be further configured to change a command set of the apparatus into a command set that is recognizable by the host device.

Other features and aspects may be apparent from the following detailed description, the drawings, and the claims.

Figure 1:
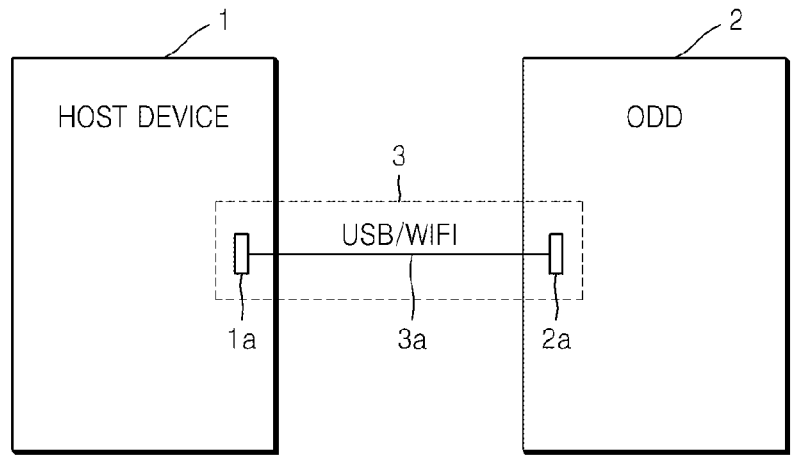
FIG. 1 is a diagram illustrating an example of a digital contents reproduction device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

According to various aspects, there is provided an authentication method that may be used to authenticate copy-protected contents such as a DVD title. According to various aspects, the method is an indirect authentication method that does not rely on a direct exchange of advanced technology attachment packet interface (ATAPI)/small computer system interface (SCSI) commands between a host device and an optical disc drive (ODD). Instead, information is exchanged between the host device and ODD, and thus, a substantial authentication process is performed using ATAPI/SCSI commands based on the exchanged information.

Referring to FIG. 1, an ODD 2 is a slave device that is connected via an interface 3 to a host device 1. Here, the host device is a reproduction device, such as a personal portable terminal, and is capable of reproducing digital contents. The reproduction device may be capable of reproducing digital contents without any direct connectivity to the ODD 2, for example, a smart TV, a digital photo frame, a tablet PC, a smartphone, and the like.

The interface 3 may include at least a pair of USB ports that are provided at interface parts 1a and 2a corresponding to the host device 1 and the slave device. Accordingly, the interface 3 including the USB ports includes a USB cable as an intercable 3a. The ODD 2 and the host device 1 may exchange information via the intercable 3a. As another example, the interface 3 may be configured to communicate via a wireless protocol. The wireless protocol may include a variety of methods such as a wireless wave connection method such as Bluetooth or an ad-hoc method or a wireless optical connection method using an infrared ray. In this example, the intercable 3a is not used for the wireless method.

The host device 1 supports a file system of a limited range due to a structural limit thereof. A typical file system that the host device 1 supports is a file allocation table (FAT) file system. The FAT file system is applied not only to a hard disk drive (HDD) but also to various types of memory cards such as compact flash (CF), secure digital (SD), multi media card (MMC), a memory stick, and the like. Although there are various file systems in addition to the above file system, the host device 1 may not support all of the file systems. That is, the host device 1 may support only one file system or a portion of the generally widely used files systems. When a slave device that is not compatible with the host device 1 is connected to the host device 1, the slave device is classified by the host device as an unknown device. For example, when an ODD with a compact disc file system (CDFS)/universal disc format (UDF) file system is connected to a host device supporting only a FAT file system, the host device will classify the ODD as an unknown device.

According to various aspects herein, a file system conversion algorithm is applied to the ODD 2 and thus the host device 1 may recognize the ODD 2. For example, the conversion may be performed by a file system conversion algorithm and the conversion algorithm may be mounted on a conversion unit or a converter included in the interface 3 of the ODD 2.

According to various aspects, a CDFS/UDF file system may be converted to a FAT file system. The conversion algorithm allows the host device 1 to recognize the ODD 2 as an acceptable slave device to obtain recognizable file system information from the ODD 2. Accordingly, the ODD 2 may be recognized by the host device 1 as a specific known device and a compatible command set and file system may be used between the ODD 2 and the host device 1.

Table 1 shows definitions of command set information as subclass codes of a USB device that may be used as an interface device in a device according to various aspects.

TABLE 1

| SubClass Code | Command Block Specification | Comment |
| --- | --- | --- |
| 00h | SCSI command set not reported | De facto use |
| 01h | Reduced Block Commands (RBC) T10 Project 1240-D | Defined outside of USB |
| 02h | MMC-5 (ATAPI) | Defined outside of USB |
| 03h | Obsolete | Was SFF-8070i |
| 04h | USB Floppy Interface (UFI) | Specifies how to interface Floppy Disk Drives to USB. |
| 05h | Obsolete | Was QIC-157 |
| 06h | SCSI transparent command set | Defined outside of USB |

TABLE 1-continued

| SubClass Code | Command Block Specification | Comment |
|---|---|---|
| 07h | Lockable Mass Storage | LSDFS specifies how host has to negotiate access before trying SCSI. |
| 08h | IEEE 1667 | Defined outside of USB |
| 09h-FEh | Reserved | Reserved |
| FFh | Specific to device vendor | De facto use |

In the USB specification, an ODD has a device class code "08h" in an interface descriptor and belongs to a mass storage. A subclass code of the ODD is "02h" and an MMC-5 (ATAPI) command set is used for the ODD.

However, a device that has a subclass code "02h" is not recognized as a device that the host device 1 supports. In this case, a subclass code "06h" that uses the most popular SCSI block commands (SBCs) is transmitted to the host device 1 so that the host device 1 may recognize the ODD 2 as a usable device. In the alternative, when the host device 1 supports the device having the subclass code "02h", the subclass code "02h" is transmitted without being changed.

As defined in Table 2 below, the ODD 2 such as a CD or a DVD is defined to have a periphery device code "05h" that uses the MMC commands set. When the host device 1 does not accept the MMC commands set, the periphery device code "05h" may be converted to "00h" which is a device code that corresponds to a device that has an acceptable commands set, for example, the SBC commands set. The device using an acceptable commands set may be a direct-access block device such as a magnetic disk capable of directly recording data. As a result, the ODD 2 changes a device class with the host device 1 and thus the host device 1 recognizes the ODD as another device which is accessible, for example, an HDD which is recognizable by a host group.

TABLE 2

| Code | Reference | Description |
|---|---|---|
| 00h | SBC | Direct-access block device (e.g., magnetic disk) |
| 01h | SSC | Sequential-access device (e.g., magnetic tape) |
| 02h | SSC | Printer device |
| 03h | SPC | Processor device |
| 04h | SBC | Write-once device (e.g., some optical disks) |
| 05h | MMC | Multi-Media logical unit (e.g., CD-ROM/-R/-RW, DVD-ROM/-RAM/-R/-RW, DVD+R/+RW, HD DVD-ROM/-R/-RAM, BD-ROM/-R/-RE) |
| 06h | — | Scanner device (obsolete) |
| 07h | SBC | Optical memory device (e.g., some optical disks) |
| 08h | SMC | Medium changer device (e.g., jukebox) |
| 09h | — | Communications device (obsolete) |
| 0Ah-0Bh | — | Obsolete |
| 0Ch | SCC | Storage array controller device (e.g., RAID) |
| 0Dh | SES | Enclosure services device |
| 0Eh | RBC | Simplified direct-access device (e.g., magnetic disk) |
| 0Fh | OCRW | Optical card reader/writer device |
| 10h | BCC | Bridge Controller Commands |
| 11h | OSD | Object-based Storage device |
| 12h | ADC | Automation/Drive Interface |
| 13h-1Eh | — | Reserved |
| 1Fh | — | Unknown or no logical unit type |

When the ODD 2 is recognized as a magnetic disk drive with respect to the host device 1, and directory entry information is requested from the host device 1, the ODD 2 converts file system information from an intrinsic format of an optical disc into a FAT file system format that is recognizable by the host device 1 and transmits the converted file system information to the host device 1. In other words, the ODD 2, which internally has intrinsic file system information in CDFS/UDF formats, converts the file system information from CDFS/UDF formats into file system information in a FAT format upon a request by the host device 1 and transmits the converted file system information to the host device 1. The conversion may be performed by a converter or a conversion unit included in the interface 3. The FAT format includes a FAT16 format formed of 16 bits and a FAT32 format formed of 32 bits.

Accordingly, the host device 1 may recognize file information including an address of contents stored on an optical disc, and thus, the host device 1 may access and reproduce a particular content.

Figure 2:
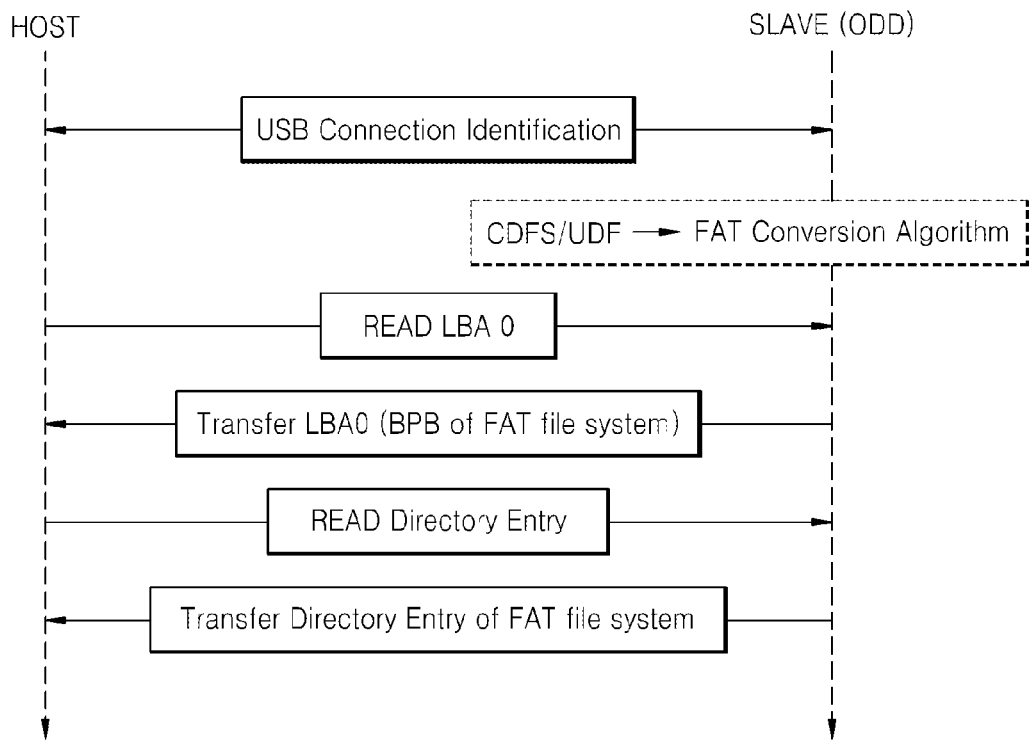
FIG. 2 is a diagram illustrating an example of a connection between a host such as an airwaves receiver and a slave such as an ODD via a USB interface.

FIG. 2 illustrates an example of a connection between the host device 1 and the ODD 2 via a USB interface. Referring to FIG. 2, the host device 1 and the ODD 2 are identified as being in a state in which mutual information exchange is possible via a USB. Next, the host device 1 requests information such as master boot record (MBR) stored in the first logic block, i.e., logical block address 0 (LBA0), and the ODD 2 transfers the boot sector and a BIOS parameter block (BPB) in a FAT format to the host device 1.

When the host device 1 requests directory entry again, the ODD 2 transfers the directory entry information in a FAT format to the host device 1. Accordingly, the host device 1 that obtained the directory entry information is in a reproducible state in which the location (address) of data (contents) of the ODD 2 may be identified and the data may be read through the address. The MBR, BPB, and directory entry information transferred from the ODD 2 to the host device 1 are in the FAT format, but they are obtained by internally converting the CDFS/UDF format to the FAT format by the conversion unit.

Table 3 below shows pseudo codes of an algorithm for converting a CDFS/UDF format to a FAT format. In this example, the algorithm is a MakeFAT function which is a FAT conversion program function.

TABLE 3

FAT conversion function/sector size = 512

Function MakeFat
  PASS IN : Integer of fat_offset
  PASSOUT : nothing (void)
  CALCULATE cur_tbl_start as 512*fat_offset
  CALL ClearFATT with sector_size
  WHILE infinite
    CALL ReadFATB with clus_start_index RETURING clus_start
    CALL ReadFATB with clus_end_index RETURING clus_end
    IF clus_start is equal to end of entry mark THEN
      QUIT function
    ENDIF
    IF cur_tbl_start?clus_start&&cur_tbl_start<=clus_end THEN
      SET buf_idx to 0
      SET clus_idx_s to cur_tbl_start
    ELSEIF cur_tbl_start<=clus_start && (cur_tbl_start+512)> clus_start
    THEN
      CALCULATE buf_idx as (clus_start-cur_tbl_start)*4
      SET clus_idx_s to clus_start
    ELSE
      SET buf_idx to −1
    END IF
    IF buf_idx is equal to −1 THEN
      QUIT function
    END IF
    REPEAT
      INCREMENT clus_idx_s
      IF clus_idx_s>clus_end THEN
        SET clus_idx_s to FAT32_LAST CLUSTER_MARK
      ENDIF

TABLE 3-continued

FAT conversion function/sector size = 512

```
    CALL WriteFATT with buf_idx and clus_idx_s
    INCREMENT buf_idx
    UNTIL cur_tbl_start+512 > clus_idx_s
END WHILE
END FUNCTION
```

In the above pseudo codes, "clus_start_index" and "clust_end_index" respectively denote a start index and an end index of a cluster. The above algorithm may be operated when the host device 1 requests a FAT. A FAT offset (fat_offset) is received as a factor or a parameter. A FAT is generated by organizing a FAT entry corresponding to "fat_offset" using file information stored in a FATB buffer into a FATT buffer.

Figure 3:
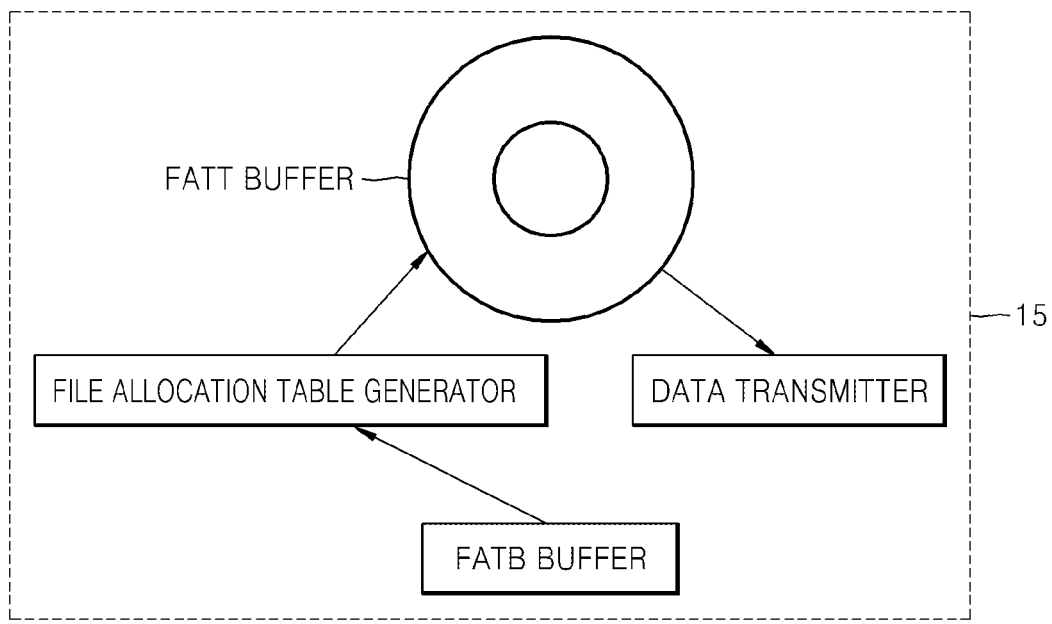
FIG. 3 is a diagram illustrating an example of a file system converter.

FIG. 3 illustrates an example of a file system converter. Referring to FIG. 3, a FATB buffer has a ring buffer type and is a part of the file system converter. The file system converter is a part of the interface 3 shown in FIG. 1 and uses an allotted area of a memory, for example, a RAM included therein. The FATB buffer (first buffer memory) stores a start position, an end position, and a file type of a file stored on an optical disc, when the optical disc is loaded. The data stored in the FATB buffer may be used as raw data during FAT conversion according to the pseudo codes.

A FATT buffer (second buffer memory) is an allocated area of the memory and is a buffer for organizing FAT entry using the file information from the FATB buffer through a function of the algorithm and storing the organized FAT entry. A FAT generator generates a FAT from an offset requested by the host device 1 using file information from the FATB buffer, and stores the generated FAT in the FATT buffer. The data stored in the FATT buffer may be transferred to the host device 1 via a data transmitter included in the interface 3. In this example, the FAT generation and transfer may be operated in parallel in independent blocks, and thus, an efficiency of the generation and transfer of a FAT may be improved.

Figure 4:
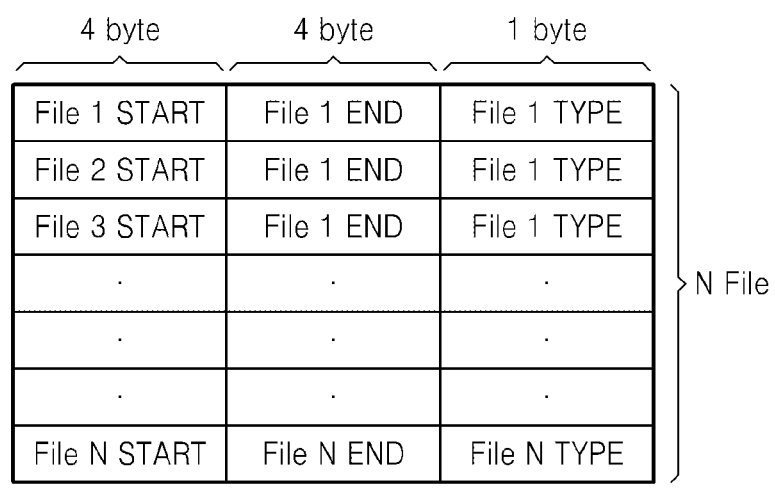
FIG. 4 is a diagram illustrating an example of a buffer memory for storing file information obtained from an optical disc used for a file system converter.

FIG. 4 illustrates an example of a FATB buffer for storing information about N files, where N is a natural number. When an optical drive having an optical disc loaded therein is driven or the optical disc is newly loaded in the optical drive, the file system converter may search all files on the optical disc and record a start position (4 bytes), an end position (4 bytes), and a file type (1 byte) of a corresponding file in the FATB buffer. For example, in a UDF or ISO-9660 file system, file data is continuously stored in consecutive single areas. Accordingly, file data may be read if the start position and the end portion of a file are known.

Figure 5:
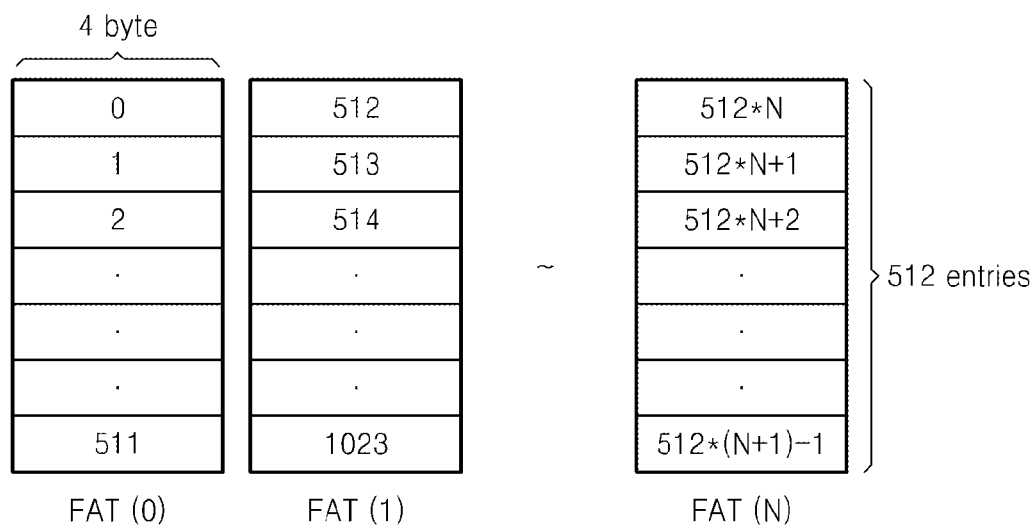
FIG. 5 is a diagram illustrating an example of a FAT.
Figure 6:
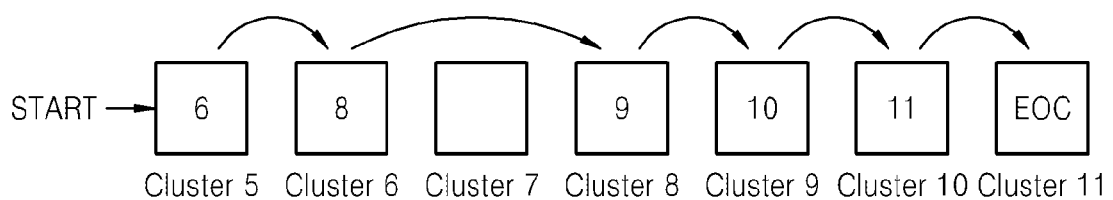
FIG. 6 is a diagram illustrating an example of a non-successive cluster chain in a general FAT system.

FIG. 5 illustrates an example of a FAT generated by the FAT conversion system. In a FAT32 file system as shown in FIG. 5, the size of a sector is 2048 bytes and the size of a FAT entry is 4 bytes. In a FAT file system illustrated in FIG. 6, file data is stored in a non-consecutive cluster chain form. Accordingly, FAT information as illustrated in FIG. 6 may be used to identify the location of the file data. In FIG. 6, each of the numerals in boxes means a cluster number. For example, when the file data is consecutively stored in cluster nos. 515, 516, and 600 starting from cluster no. 513, cluster no. 515 that is the next cluster is recorded in Entry 513 of FAT, 516 in Entry 515, and end of cluster (EOC) in Entry 600 so that the file data may be read out.

Figure 7:
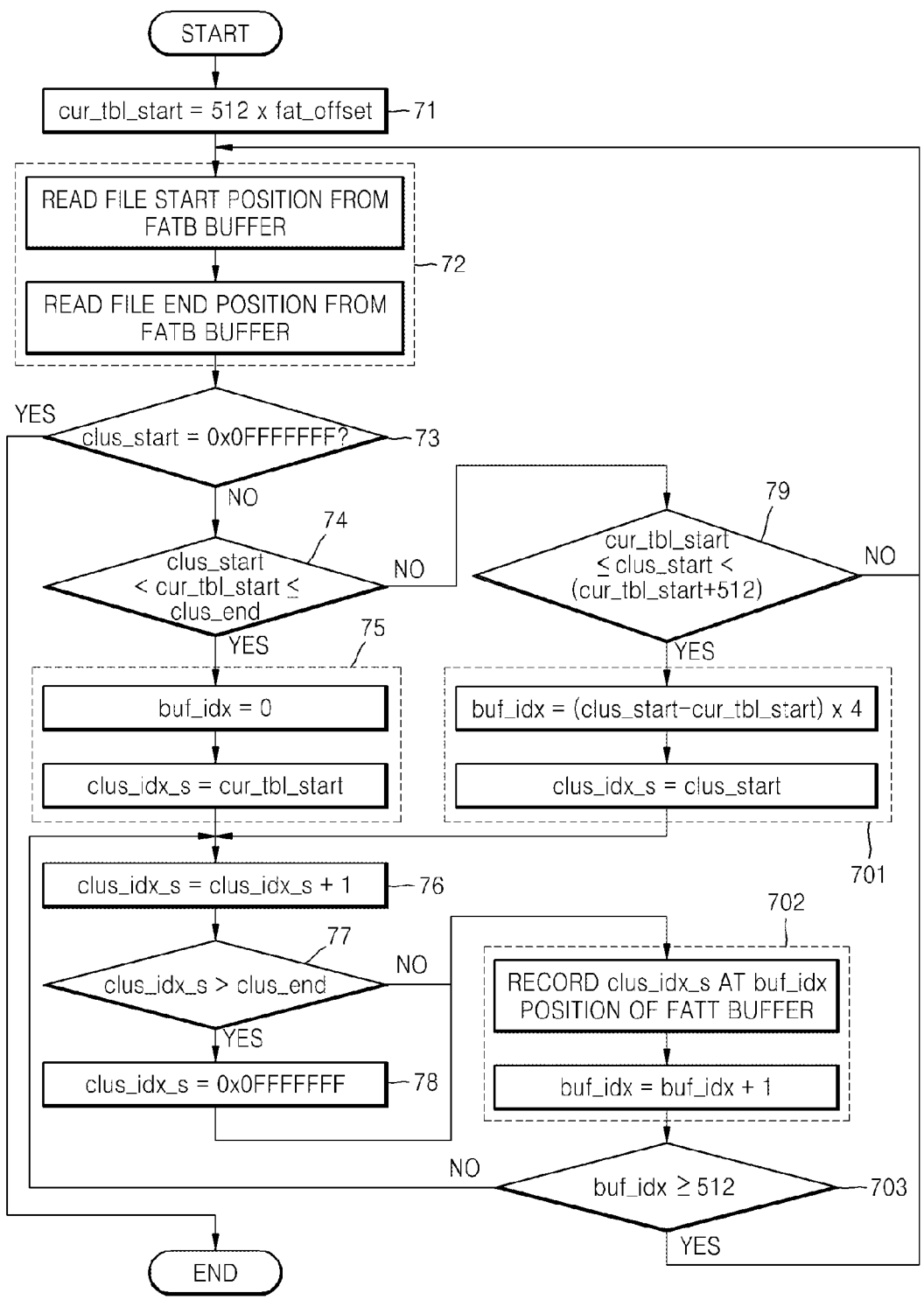
FIG. 7 is a diagram illustrating an example of a FAT generation method.

FIG. 7 illustrates an example of a FAT generation method. As described above, a value "fat_offset" may be received through a parameter and multiplied by 512 which is a sector size and then put into an instance variable "cur_tbl_start" (Operation 71). In a general case, in a FAT, because data is consecutively stored in a predetermined size from LBA 32 of a disc, data of an address of a corresponding file is read and transferred upon a request by the host device. When no FAT is previously stored and a FAT is generated, in real time, as described herein, an appropriate FAT is generated to fit to the requested address and is transferred to the host device. Here, the offset may be determined based on a start position of the FAT. In an example in which a FAT starts from LBA 32, the "fat_offset" is determined so that, when the host device requests data of LBA 32, "fat_offset" is 0, and when data of LBA 33 is requested, "fat_offset" is 1. When a current cluster size is 2048 bytes and an address indicating the cluster number is 4 bytes, a cluster start address "cur_tbl_start" is calculated by multiplying "fat_offset" by 512. In other words, "cur_tbl_start" indicates the first cluster number of the FAT entry of the requested address.

In this case, "clus_start" and "clus_end" are set by reading data corresponding to the start position and the end position of a file from a FATB buffer (Operation 72). The FATB buffer may store a file start position and a file end position of all files on a disc. Whenever a loop is repeated, the start position and the end position of a next file may be read and stored in "clus_start" and "clus_end" in units of 4 bytes. When a value of "clus_start" is 0x0FFFFFFF while the loop is repeated, it may be determined that no more file information exists and the algorithm that generates a FAT is terminated.

According to various aspects, the generation of a FAT, for example, records a FAT entry in the FATT buffer having a 2048-byte size. In the previous example, if the size of a FAT entry (cluster number) is 4 bytes, a 2048 bytes FATT may represent 512 FAT entries. In order to transfer a FAT requested by the host device 1, the "clus_start" and "clus_end" of a file read from the FATB buffer are compared with "cur_tbl_start". If "cur_tbl_start" is greater than "clus_start" and less than or equal to "clus_end", Operation 75 is performed. Otherwise, Operation 79 is performed.

In Operation 75, an instance variable "buf_idx" for storing a buffer index to determine a record position in the FATT buffer that is greater than a file start is set to "0" (clear) and a cluster number to be recorded in a corresponding "buf_idx" is stored in an instance variable "clus_idx_s" that is a temporary counter. A 1 is added to "clus_idx_s" until "clus_idx_s" is greater than "clus_end" (Operation 76). When "clus_idx_s" is greater than "clus_end" (Operation 77), 0x0FFFFFFF indicating the last of a cluster chain is put into "clus_idx_s" (Operation 78). Next, "clus_idx_s" is recorded at the position "buf_idx" of the FATT buffer and the value of "buf_idx" is increased by 1 (Operation 702). The process of setting "clus_idx_s" and recording "clus_idx_s" at the position "buf_idx" of the FATT buffer is continuously repeated until "buf_idx" is greater than 512. In other words, if "buf_idx" is less than 512 after Operation 702, the process returns to Operation 72. Otherwise, the process goes to Operation 76.

Since in Operation 79, "cur_tbl_start" is a start cluster number of a FAT corresponding to a requested "fat_offset", if "clus_start" is equal to or greater than "cur_tbl_start" and less than "cur_tbl_start"+sector size 512, the process goes to Operation 701. In Operation 701, "(clus_start-cur_tbl_start)*4" is substituted in "buf_idx" to set the start position to record in the FATT buffer and "clust_start" is substituted in "clus_idx_s" to set the start value to record in "buf_idx", and then the process goes to Operation 76.

The above description relates to a FAT file system recognition and operation process and the conversion from the CDFS/UDF format to the FAT format is performed in real time by the conversion unit at the request of the host device.

Figure 8:
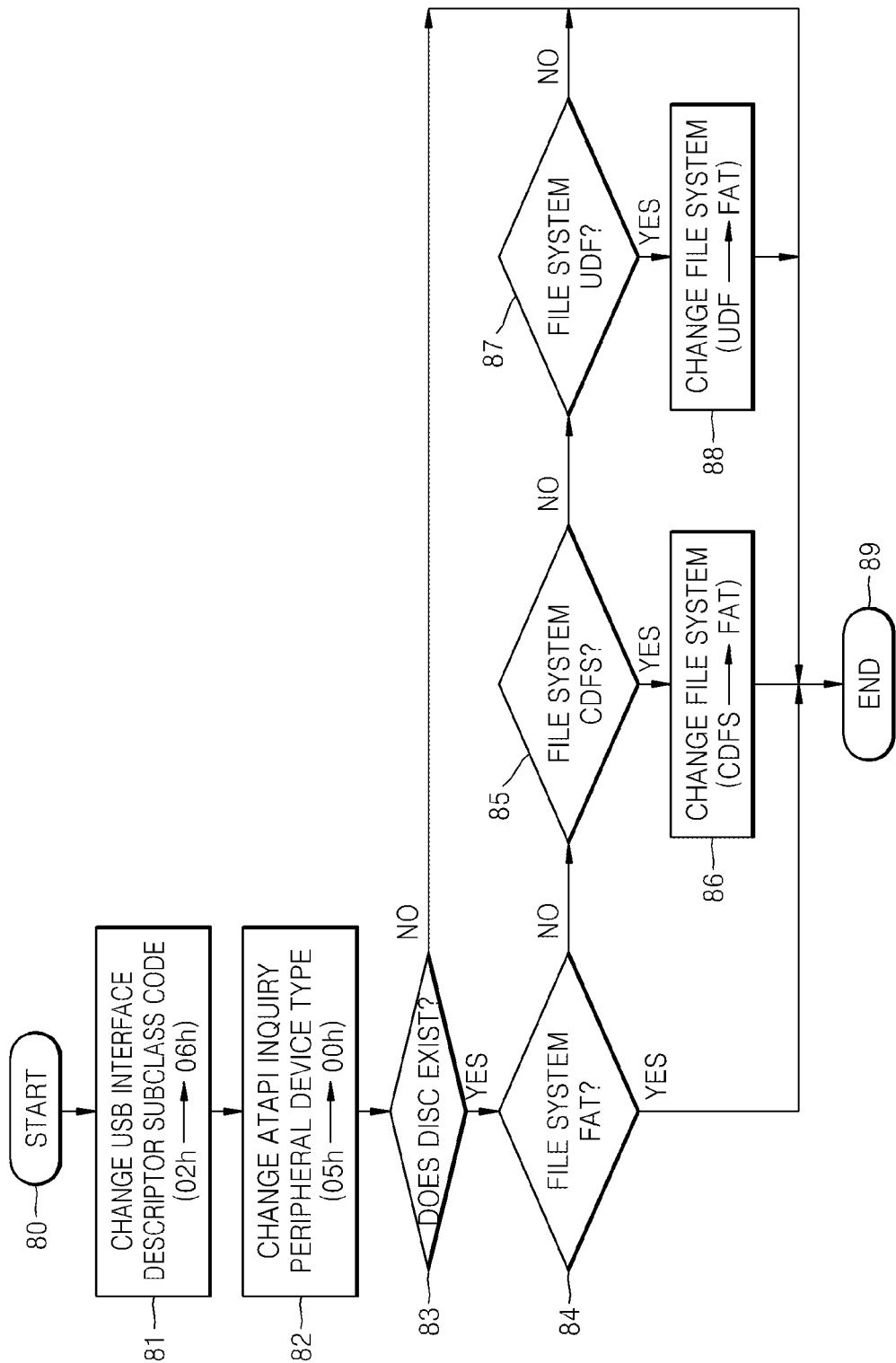
FIG. 8 is a diagram illustrating an example of a method of reproducing (accessing) contents of an optical disc using three types of formats by employing a host supporting a FAT file system.

FIG. 8 illustrates an example of a method of reproducing (accessing) contents of an optical disc adopting three types of file formats (FAT, CDFS, and UDF) using the host device supporting a FAT file system.

Referring to FIG. 8, the power of the ODD 2 is turned on while an optical disc device is connected to the host device 1 (Operation 80). In response, subclass 02h of a USB interface descriptor is changed to subclass 06h that the host device 1 recognizes (Operation 81). After the change of subclass, the ODD 2 is changed to a device type having a command set that the host device 1 recognizes. For example, a device type 05h (corresponding to a multi-media logical unit) is changed to 00h (corresponding to a direct-access block device, e.g., magnetic disk) using an SBC command set (Operation 82) (refer to Table 2 and the above description).

Whether an optical disc exists on a disc tray is checked (Operation 83). When an optical disc exists, the process goes to a next filed system checking operation. Otherwise, the process ends. After searching the files on the optical disc, the above-described file system converter stores a start position, an end position, and a file type of a corresponding file in the FATB buffer.

In the first file system checking operation, whether an optical disc is a FAT format disc is determined (Operation 84). For example, a DVD-RAM may be formatted with a UDF or FAT file system. If the DVD-RAM is formatted with the FAT format, the process ends because the host device 1 supports the FAT format (Operation 89). If the DVD-RAM is formatted with a format other than the FAT format, whether the optical disc is in a CDFS format is determined (Operation 85). If the optical disc is a CDFS format disc, the file system of the ODD 2 is changed from the CDFS format to the FAT format to be recognized by the host device 1 (Operation 86). If the optical disc is not a CDFS format disc, it is determined in a next Operation 87 whether the optical disc is a UDF format disc. If the optical disc is a UDF format disc, the UDF file system is changed to the FAT file system to be recognized by the host device 1 (Operation 88).

After the above process, the host device 1 may take FAT file system information such as a directory entry, FAT, etc. from the ODD 2, and thus, contents may be uploaded from the ODD 2 and then reproduced.

The ODD 2 with a CDFS/UDF format may be connected to the host device 1 for use by the above-described method. However, copy-protected contents such as a DVD title should pass an authentication process to be used. However, as described above, a host device 1 that does not have an ODD device drive is not able to perform the authentication process. According to various aspects, there is provided an authentication method that enables an authentication process even when the host device 1, which is an electronic device such as a smart TV, a tablet PC, a digital photo frame, and a smart phone, has no ODD, and a device using the authentication method.

According to various aspects, the host device 1 and the ODD 2 are recognized using an SBC command set, for example, a magnetic disk drive, using an MMC command set. The authentication process is performed on copy-protected contents using the FAT file system.

According to the authentication process, a direct authentication process using by an ATAPI command set as in the conventional method may be impossible. To overcome this problem, information may be transferred from the host device 1 to the ODD 2 using the SBC command set, that is, the FAT file system. The ODD 2 may obtain an authentication related return value based on the information from the host device 1 using an internal ATAPI command set and return the obtained value using the FAT file system. The FAT file system used in the authentication process may be stored in an area in an internal memory of the ODD 2, which is referred to as the authentication area. For example, the authentication area may exist in a form of a virtual file to be accessed by the FAT file system.

According to various aspects, authentication related query data from the host device 1 is stored in the authentication area or virtual file (hereinafter, referred to as the virtual file) using the FAT file system. The ODD 2 parses or interprets the authentication related query stored in the virtual file and reconfigures an ATAPI command corresponding to the authentication related query and executes the reconfigured ATAPI command. A return value obtained from the execution of the ATAPI command is stored in the virtual file in the internal memory. The host device 1 reads the return value from the virtual file. Accordingly, a plurality of steps of challenges and reports for authentication of a DVD tile may be performed through the above processes.

Figure 9:
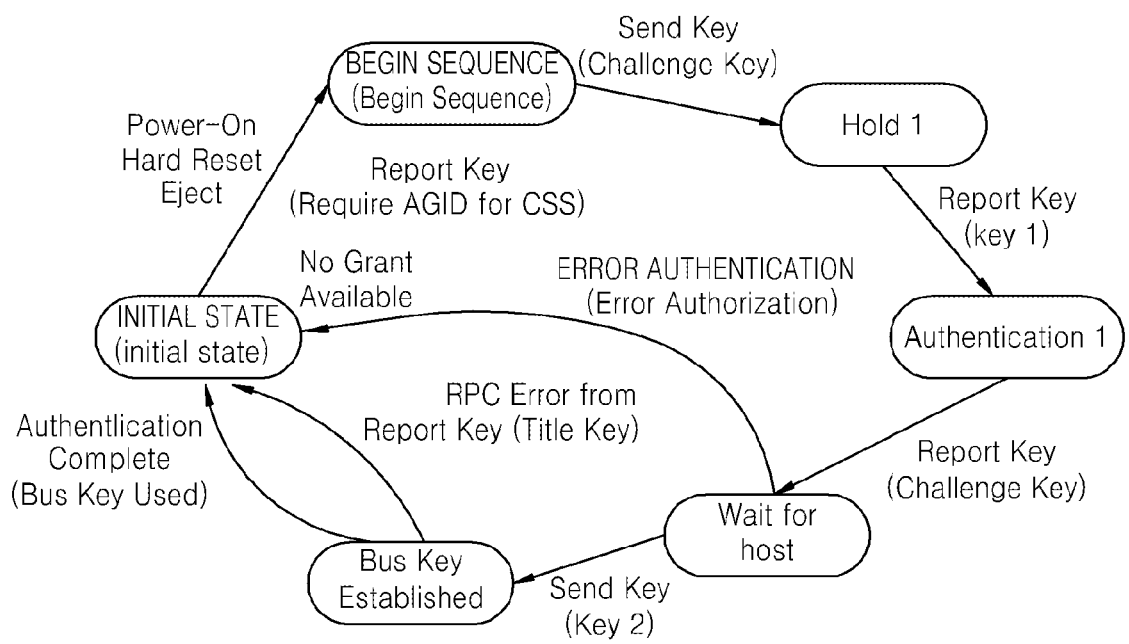
FIG. 9 is a diagram illustrating an example of a CSS authentication process for reproducing a DVD title.

As it is well known, in disc authentication for a content scrambling system (CSS), the steps of challenges and reports are performed through the ATAPI/SCSI commands based on a DVD encryption standard and a bus key is obtained, an example of which is illustrated in FIG. 9. A sequence begins as authentication grant ID (AGID) for CSS is requested when the ODD 2 is initialized. In the repeated steps of challenges and reports during the sequence, the host device 1 and the ODD 2 perform mutual information exchange through writing and reading information with respect to the authentication area on the internal memory of the ODD 2. When authentication succeeds, a bus key may be obtained.

According to various aspects herein, corresponding data may be recorded in an authentication area in the process of exchanging a send key and a report key exchanged between the host device 1 and the ODD 2. Then, a receiving side may read the recorded data and perform an operation for authentication.

Figure 10:
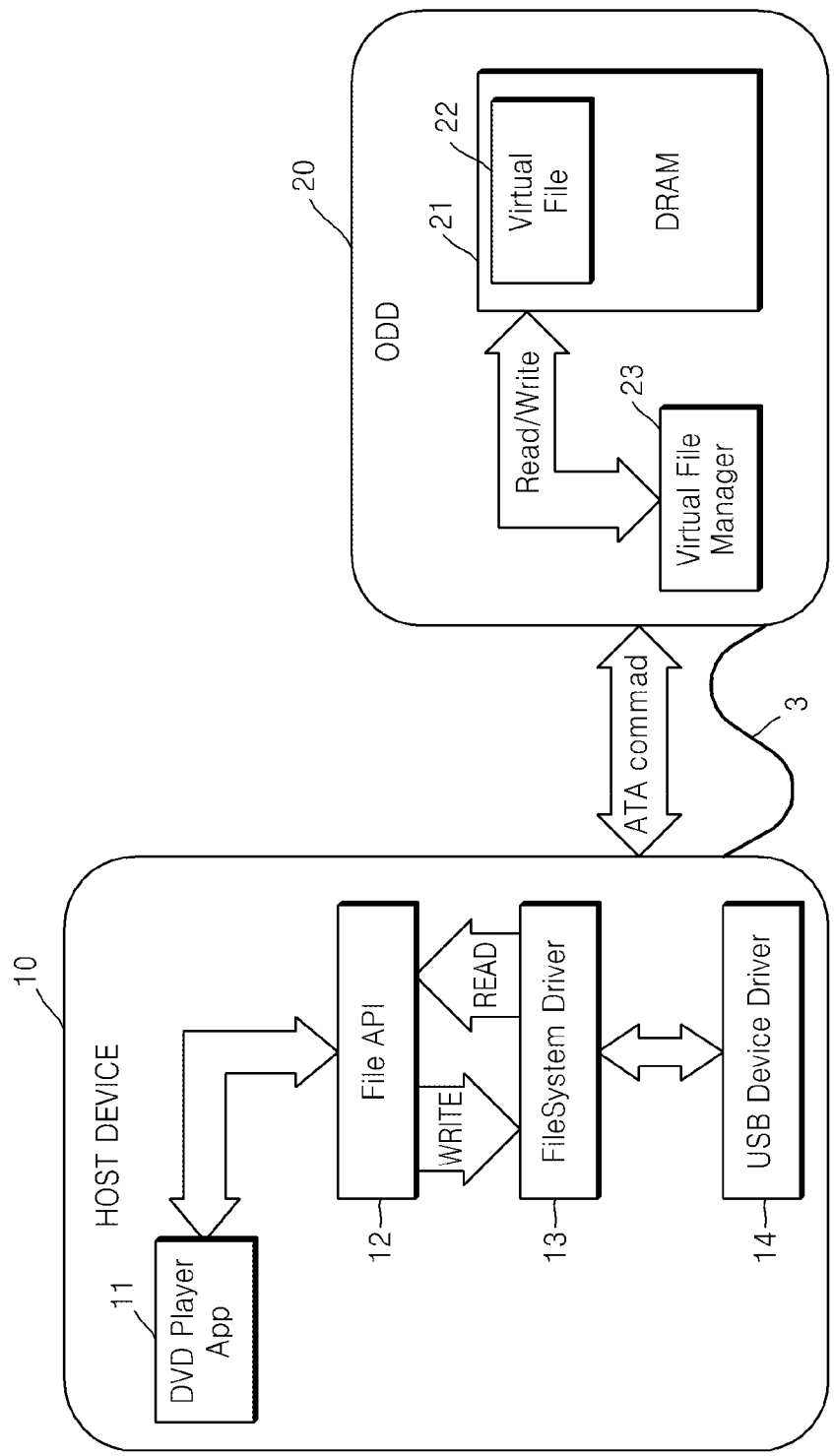
FIG. 10 is a diagram illustrating another example of a digital contents reproduction device.

FIG. 10 illustrates an example of a DVD title reproduction system.

The system of FIG. 10 includes a host device and a mobile terminal 10 that is used as a reproduction apparatus. The mobile terminal 10 may be connected to an ODD 20 via a wired or wireless interface such as USB or WiFi, to enable mutual information exchange. The host 10 recognizes the ODD 20 as a magnetic disk drive such as a hard disk drive (HDD) that may be directly accessed by using the above-described algorithm. The exchange of information is performed by recording information in the authentication area using a FAT system. Thus, the authentication area for read and write of information in the FAT system may exist as a virtual file in the memory.

Referring to FIG. 10, the mobile terminal includes a DVD reproduction unit for example, a DVD player app 11 in the form of an application, a file application programming interface (API) 12 for a mobile terminal, a file system driver 13, and an interface device driver such as a USB device drive 14. The ODD 20 additionally includes a virtual file 22 stored in an authentication area or a buffer memory area included in a memory 21 such as DRAM. The ODD 20 also includes an authentication area manager 23 that issues an ATAPI/SCSI command for driving the ODD 20 by parsing the data recorded in the virtual file 22 and storing a report value in the virtual file 22 as a result of a command execution.

Figure 11:
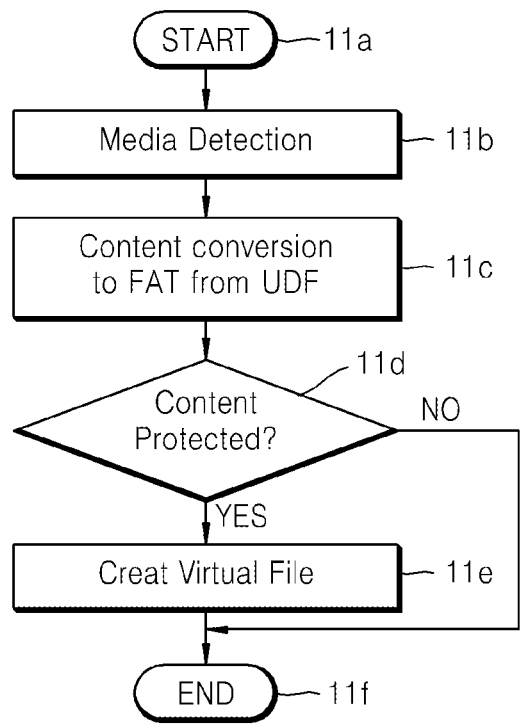
FIG. 11 is a diagram illustrating an example of a method of allocating an authentication region in a memory device in an ODD.

An example of the authentication method is further described herein. FIG. 11 illustrates an example of a method of generating a virtual file on the ODD. Referring to FIG. 11, after the ODD 20 is driven (Operation 11a), whether a medium exists is detected (Operation 11b). If the detected medium is in a UDF format, the UDF format is converted to the FAT file system by the above-described method (Operation 11c). If the medium includes copy-protected contents and thus an authentication process is to be performed (Operation 11d), an authentication area, that is, a virtual file, is generated in the memory of the ODD (Operation 11e) and the preparing step for a subsequent authentication process is performed (11f).

After the virtual file is generated by the ODD, the DVD reproduction unit 11 of the host, for example, a mobile terminal, performs the authentication process. For example, an ATAPI command process flow using the API of FIG. 12 may be used in the authentication process.

Figure 12:
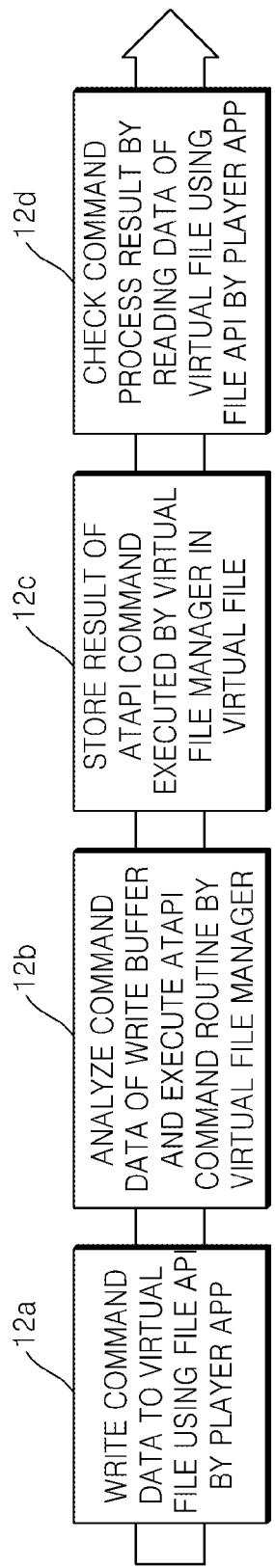
FIG. 12 is a diagram illustrating an example of a method of recording a command package and a parameter on a virtual file in an ODD by using a file API of a host.

Referring to FIG. 12, the mobile terminal performs authentication through the file API of a corresponding OS platform through the write and read process of data with respect to a virtual file. First, "SEND KEY" calls a file write function of the file API and the interface driver transfers data to a corresponding address of the virtual file or the authentication area of the ODD 20 using the ATAPI command (Operation 12a). The transferred data includes an ATAPI command packet and parameter data. The virtual file manager parses data of the virtual file, converts the parsed data to the ATAPI command, and executes a command routine according thereto (Operation 12b).

Then, a command routine execution result value "REPORT KEY" is stored in the virtual file and one step of processing a command is completed (Operation 12c). The DVD reproduction unit 11 of the mobile terminal 10 calls a file read function to check a result of the ATAPI command execution and reads the data stored in the virtual file (Operation 12d). The file write and read operations correspond to an operation of processing one ATAPI command. Thus, in the steps of a CSS authentication process, the above write and read operations may be repeated several times. Accordingly, an authentication process of a content-protected medium may be successfully performed and thus copy-protected contents may be reproduced.

Figure 13:
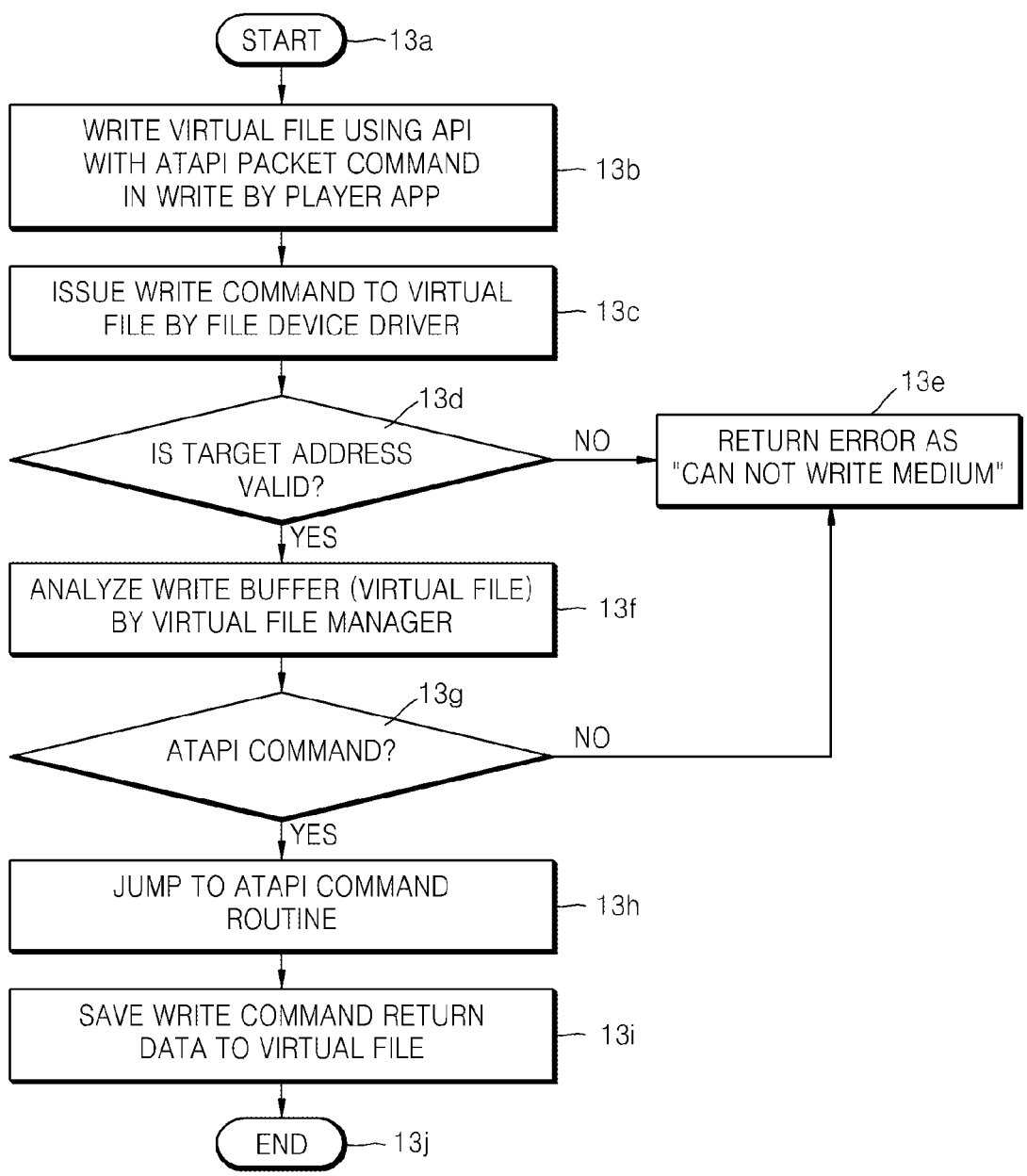
FIG. 13 is a diagram illustrating an example of a method of transferring (recording) information or data for an authentication process to (on) an ODD.

FIG. 13 illustrates an example of a method of writing a file executed in the authentication process. Referring to FIG. 13, when an authentication process begins (Operation 13a), the DVD reproduction unit 11 in a type of application software calls a file API function. An ATAPI command packet and a parameter to be recorded are transferred to the virtual file via a file API (Operation 13b).

A file device driver issues a write command to the virtual file using the file API (Operation 13c). If the virtual file is invalid (Operation 13d), that is, a particular address is ineffective or does not exist in a memory area of the ODD 2, the process returns an error (Operation 13e). If the virtual file is valid, the process goes to the next parsing process. The virtual file manager analyzes data in the authentication area (Operation 13f). If the data is an ATAPI command (Operation 13g), the process goes to the next ATAPI command routine (Operation 13h). Otherwise, the process returns an error (Operation 13e). In the ATAPI command routine, the command parsed from the data is executed and a result value is stored in the virtual file (Operation 13i), thereby allowing a one-time write process to be completed (Operation 13j)

Figure 14:
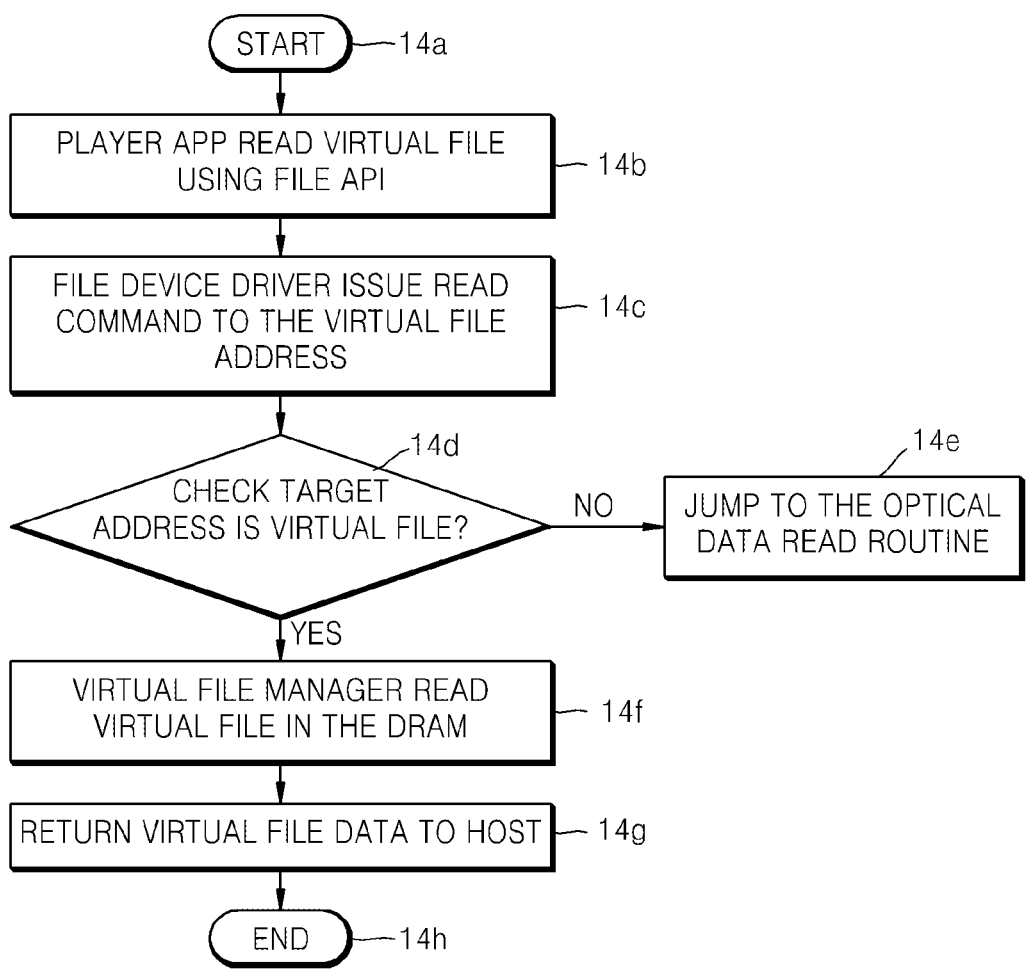
FIG. 14 is a diagram illustrating an example of a method of storing an ATAPI command processing result value in an authentication region of an ODD.

FIG. 14 illustrates an example of a method of notifying (reporting) the mobile terminal of a result value obtained from the above process. As described above, the DVD reproduction unit 11 of the mobile terminal that transfers the ATAPI command packet and the parameter to the ODD 2 through the above write process holds the processing of the ODD 2 and starts to read a return value (Operation 14a). When the return value is stored in the virtual file, the DVD reproduction unit 11 attempts to obtain the result value from the virtual file using a file API (Operation 14b). Accordingly, the file device driver issues a read command with respect to the virtual file (Operation 14c). If the address of the virtual file is invalid, it is determined that data from a general area, not the virtual file, is to be read. Thus, the process jumps to an optical disc data read routine (14e). On the other hand, if the address of the virtual file is valid, the virtual file manager reads the virtual file from the memory such as DRAM and transfers the read virtual file to the mobile terminal that is the host device 1 (Operation 14g). Then, the process is terminated (Operation 14h).

The device and method according to various aspects may be used when a connection to an ODD is not allowed, or, when the connection is allowed, an intrinsic file system of the ODD is not recognized. For example, when the ODD is not compatible with a particular host device, for example, device information compatible with the host device and a function and operation of converting to a FAT system are provided to the ODD thereby increasing a range of use. Also, according to various aspects, a device that does not have a driver for directly driving an ODD, for example, a smart TV, a smartphone, a digital photo frame, and the like, may reproduce copy-protected contents.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An authentication method for an optical disc drive (ODD) for driving a medium and a host device for reproducing contents stored in the medium, the method comprising:
connecting the optical disc drive (ODD) and the host device through an interface device;

allocating, in the ODD, an authentication area for storing query data for authenticating contents and result data thereof; and performing an authentication for reproducing contents by mutually exchanging data between the host device and the ODD via the authentication area, wherein the authentication area comprises a virtual file comprising a format of a file allocation table (FAT) system stored in an area of the memory.

2. The authentication method of claim 1, wherein the ODD is recognized as a non-optical storage device with respect to the host device.

3. The authentication method of claim 2, wherein the recognized non-optical storage device comprises a magnetic disc drive.

4. The authentication method of claim 1, wherein the medium comprises a digital versatile disc (DVD).

5. The authentication method of claim 1, wherein the host device and the ODD are connected to each other via a universal serial bus (USB) method or a WiFi method.

6. The authentication method of claim 1, wherein the exchanging of data comprises the ODD recording information in the authentication area using a file allocation table (FAT) system format.

7. The authentication method of claim 1, comprising checking a file system in response to determining that an optical disc exists in the optical disc drive, the checking the file system comprising determining whether the optical disc is formatted with a FAT format, determining whether the optical disc is in a CDFS format in response to determining that the optical disc is not formatted with the FAT format, changing the optical disc from the CDFS format to the FAT format in response to determining that the optical disc is in the CDFS format, determining whether the optical disc is in a UDF format in response to determining that the optical disc is not in the CDFS format, and changing the optical disc from the UDF format to the FAT format in response to determining that the optical disc is in the UDF format.

8. The authentication method of claim 1, comprising determining an offset based on a start position of an FAT, the offset being zero in response to the FAT starting from an initial logical block address, incrementing the offset in response to a subsequent logical block address being requested, and calculating a cluster start address by multiplying the offset by a number of entries, the number of entries being calculated by taking a quotient of a current cluster size and a number of bytes of an address indicating a cluster number.

9. The authentication method of claim 8, comprising setting a start position to record in a FATT buffer in response to determining that a value of a start position of a next file is equal to or greater than the cluster start address and less than or equal to a sum of the cluster start address and the number of entries.

10. A contents reproduction apparatus comprising:

an optical disc drive (ODD) configured to drive a medium containing contents, the ODD comprising a memory device including an authentication area for storing data for authentication of the contents;

a host device connected to the ODD and configured to generate a command packet for the authentication of the contents and data including parameters;

a file system driver configured to store the data in the authentication area of the ODD; and an interface device configured to provide a connection between the host device and the ODD, wherein the authentication area comprises a virtual file comprising a format of a file allocation table (FAT) system stored in an area of the memory.

11. The contents reproduction apparatus of claim 10, wherein the host device recognizes the ODD as a non-optical storage device.

12. The contents reproduction apparatus of claim 10, wherein the interface device enables the host device and the ODD to be connected to each other via a universal serial bus (USB) method or a WiFi method.

13. The contents reproduction apparatus of claim 10, wherein the ODD converts a universal disc format (UDF) file system to the FAT file system.

14. The contents reproduction apparatus of claim 10, wherein the medium comprises a digital versatile disc (DVD).

15. The contents reproduction apparatus of claim 10, wherein the ODD further comprises an authentication area manager configured to process the data in the authentication area, execute a command for the authentication of the contents, and store a result in the authentication area.

16. An apparatus for reading content from an optical disc, the apparatus comprising:

a controller configured to convert a file from the optical disc, which is in an intrinsic format, into a file allocation table (FAT) format that is compatible with a host device; and a storage device configured to store the converted file in an authentication area that is accessible by the host device.

17. The apparatus of claim 16, wherein, in response to the apparatus being connected to the host device via a universal serial bus (USB) connection, the controller is further configured to change a USB descriptor of the apparatus into a subclass that is recognizable by the host device.

18. The apparatus of claim 17, wherein the controller is further configured to change a command set of the apparatus into a command set that is recognizable by the host device.

19. The contents reproduction apparatus of claim 10, wherein the interface device comprises a file system converter comprising a FATB buffer, a FAT generator, and a FATT buffer, the FATB buffer comprising a ring buffer type and configured to store a start position of all files on an optical disc, an end position of all files on the optical disc, and a file type of all files stored on the optical disc in response to the optical disc being loaded in the optical disc drive, and configured to store the file as raw data during an FAT conversion process, the FAT generator configured to generate a FAT from an offset requested by the host device using information of the start position, the end position, and the file type in the FATB buffer, and the FATT buffer configured to organize the generated FAT, and store the generated FAT.

20. The contents reproduction apparatus of claim 19, wherein the FATB buffer, the FAT generator, and the FATT buffer operate in parallel in independent blocks to generate and transfer one or more FATs simultaneously and efficiently.

* * * * *